United States Patent [19]

Oshino et al.

[11] Patent Number: 5,405,934
[45] Date of Patent: Apr. 11, 1995

[54] PROCESS FOR PRODUCING (CO)POLYCARBONATE

[75] Inventors: Yasuhiro Oshino; Tatsuya Kanno, both of Hyogo, Japan

[73] Assignee: Daicel Chemical Industries, Ltd., Osaka, Japan

[21] Appl. No.: 159,840

[22] Filed: Nov. 30, 1993

[30] Foreign Application Priority Data

Dec. 11, 1992 [JP] Japan .................. 4-331421
Oct. 21, 1993 [JP] Japan .................. 5-263420

[51] Int. Cl.⁶ .............................. C08G 64/00
[52] U.S. Cl. .................. 528/204; 528/196; 528/198; 528/199
[58] Field of Search ........... 528/196, 198, 204, 199

[56] References Cited

U.S. PATENT DOCUMENTS 4,345,062  8/1982  Brunelle ...................... 528/198

FOREIGN PATENT DOCUMENTS 675190   7/1966  Belgium .
360578   3/1990  European Pat. Off. .
0382250  8/1990  European Pat. Off. .
0435124  7/1991  European Pat. Off. .
2334852  1/1974  Germany .

OTHER PUBLICATIONS

Database WPI, Week 9226, Derwent Publications Ltd., London, GB; AN 92-213351 & JP-A-4 142 329 (Daicel Chemical Ind.) 15 May 1992 abstract.
Database WPI, Week 9217, Derwent Publications Ltd., London, GB; AN 92-136812 & JP-A-4 077 549 (Daicel Chemical Ind.) 11 Mar. 1992 abstract.

*Primary Examiner*—John Kight, III
*Assistant Examiner*—Terressa Mosley
*Attorney, Agent, or Firm*—Flynn, Thiel, Boutell & Tanis

[57] ABSTRACT

A process for producing a (co)polycarbonate having excellent thermal resistance, hue and impact resistance and a high molecular weight, which comprises conducting a melt-polycondensation of a dihydroxy compound and a carbonic diester as monomers in the presence of a transesterification catalyst in a tank reactor, while removing a monohydroxy-compound formed by the melt-polycondensation, thereby obtaining a reaction mixture comprising a prepolymer in a molten state (the first step), cooling the molten reaction mixture obtained in the first step to solidify it (the second step), and conducting a melt-polycondensation of the reaction mixture comprising the prepolymer in a horizontal polycondensation reactor, thereby obtaining a reaction mixture comprising a high-molecular-weight (co)polycarbonate (the third step).

16 Claims, No Drawings

PROCESS FOR PRODUCING (CO)POLYCARBONATE

BACKGROUND OF THE INVENTION

1. Field of the Invention

The present invention relates to a process for producing a colorless (co)polycarbonate having a high molecular weight by polycondensing a dihydroxy compound with a carbonic diester in the presence of a transesterification catalyst.

2. Description of the Related Art

A polycarbonate having a high molecular weight is a general-purpose engineering thermoplastic which is useful in various fields, particularly as injection molding material or sheet material substituting for window pane. It is said that the polycarbonate usually has excellent thermal resistance, transparency and impact resistance.

Generally known processes for producing a polycarbonate include, for example, a phosgene process wherein a dihydroxy compound is reacted with phosgene by interfacial polycondensation and a transesterification process wherein a dihydroxy compound is reacted with a carbonic diester in a molten state.

A representative transesterification process comprises reacting a dihydric phenol with a carbonic diester in the presence of a transesterification catalyst under heating and reduced pressure while distilling off a formed phenol to prepare a prepolymer and then reacting the prepolymer under heating to 290° C. or above in a high vacuum and distilling off a formed phenol to obtain a polycarbonate having a high molecular weight (see U.S. Pat. No. 4,345,062).

It is known that in the transesterification process, a prepolymer is prepared in an ordinary tank reactor having stirring blades during the initial stage of the reaction and then the polycondensation reaction is conducted in, for example, a vented horizontal extruder in order to efficiently conduct the reaction to thereby obtain a polycarbonate having a high molecular weight.

However, the transesterification process has the problem that a polycarbonate having a high molecular weight has such an extremely high melt viscosity, unlike other engineering plastics, that a temperature as high as 280° C. or above is necessitated for the reaction and so is a high vacuum (1 to $10^{-2}$ Torr) for distilling off the formed monohydroxy compound having a high boiling point, which makes the industrialization of the process difficult from the viewpoint of the equipment. Another problem of the transesterification process is that the high reaction temperature and so forth exert unfavorable influences on the hue, thermal resistance, residence stability in the molding machine, water resistance and weather resistance of the formed polycarbonate.

It is described in "Polycarbonate Resin", third edition, p. 64 (published by the Nikkan Kogyo Shimbun Ltd.) that when an alkaline catalyst is used, bisphenol A as the monomer is decomposed and thereby a colored substance and a resinous substance are formed. It is also described therein that when a polycarbonate is prepared in the presence of an alkali at a high temperature, a side reaction similar to the Kolbe-Schmitt reaction occurs to form branched or crosslinked products.

Under these circumstances, it has been eagerly demanded to develop a process for producing a polycarbonate having a high molecular weight and excellent thermal resistance, hue and impact resistance by the polycondensation reaction of a dihydroxy compound with a carbonic diester in the presence of a transesterification catalyst.

DISCLOSURE OF THE INVENTION

SUMMARY OF THE INVENTION

The present inventors have confirmed that in the polycondensation of a dihydric phenol with a carbonic diester as the carbonate bond-forming compounds in the presence of a transesterification catalyst, when a prepolymer obtained in the first polycondensation reaction step is held in a molten state by heating until it is sent into the second polycondensation reaction step, side reactions gradually proceed during this period to color the resin and also to exert an undesirable influence on the hue, thermal resistance, residence stability in the molding machine, water resistance, weather resistance, etc., of the intended polymer.

In the first polycondensation reaction step, a prepolymer is prepared by a reaction during the initial stage of polymer production in an ordinary tank reactor having stirring blades and, in the second polycondensation reaction step, a polycondensation reaction is conducted in an apparatus such as a vented horizontal extruder to obtain a polycarbonate having a high molecular weight. Usually the reaction is conducted batchwise in tile first polycondensation reaction step and continuously in the second polycondensation reaction step so as to increase the polymer-production capacity. Therefore, in the prior art, it was necessary to hold the prepolymer obtained in the first polycondensation reaction step in a molten state by heating until it was sent into the second polycondensation reaction step.

The present inventors have confirmed that when the prepolymer is held at a high temperature in a low vacuum or under atmospheric pressure, $CO_2$ formed by the thermal decomposition of the carbonate compounds, i.e., the carbonic diester as the monomer and the prepolymer formed, is not removed from the system but remains therein and, as a result, $CO_2$ is consumed by a side reaction similar to the Kolbe-Schmitt reaction to exert an undesirable influence such as coloring on the resultant resin. The present inventors have also confirmed that when a resin outlet of the first polycondensation reactor is connected to a resin inlet of the second polycondensation reactor with a pipe to send the resin in a molten state, $CO_2$ formed by the thermal decomposition of the carbonate compounds in the pipe cannot be removed from the system and exerts an undesirable influence such as coloring on the resultant resin in the same manner as that described above.

The present inventors have found that when the formed prepolymer is solidified by cooling it to its glass transition temperature or below, in order to avoid the holding of the prepolymer in a molten state by heating and the tranportation of the molten prepolymer, so that the time taken for exposing the prepolymer to a high temperature is reduced as a whole, the progress of the thermal decomposition reaction can be inhibited and no undesirable influence is exerted on the hue, thermal resistance, residence stability in the molding machine, water resistance, weather resistance, etc., of the intended polymer. The present invention is accomplished on the basis of this finding.

Thus, the present invention relates to a process for producing a (co)polycarbonate which comprises conducting a melt-polycondensation of a dihydroxy compound and a carbonic diester as monomers in the presence of a transesterification catalyst in a tank reactor, while removing a monohydroxy compound formed by the melt-polycondensation, thereby obtaining a reaction mixture comprising a prepolymer in a molten state (the first step), cooling the molten reaction mixture obtained in the first step to solidify it (the second step), and conducting a melt-polycondensation of the reaction mixture comprising the prepolymer in a horizontal polycondensation reactor, thereby obtaining a reaction mixture comprising a high-molecular-weight (co)polycarbonate (the third step).

The process according to the present invention includes a process for producing a polycarbonate characterized in that in the production of a polycarbonate by melt-polycondensing a dihydroxy compound with a carbonic diester in the presence of a transesterification catalyst, the process comprises a first polycondensation reaction step wherein the above mixture is fed into a tank reactor to conduct the polycondensation reaction in a molten state while a monohydroxy compound formed by the reaction and the unreacted monomers are removed, thereby obtaining a prepolymer, a step wherein the prepolymer obtained in the first polycondensation reaction step is cooled to convert the molten prepolymer into a solid one, and a second polycondensation reaction step wherein the solid prepolymer described above is melted and fed into a horizontal polycondensation reactor to conduct the polycondensation reaction, thereby obtaining a polycarbonate having a high molecular weight.

In the first step, part of the carbonic diester may be removed with the monohydroxy compound.

A blocking agent may be added in the first step, the second step or the third step.

The transesterification catalyst is preferably a compound selected from the group consisting of an electron-donating amine compound, an alkali metal compound and an alkaline earth metal compound, or a borate.

In the second step, the cooling of the molten reaction mixture is preferably conducted with an inert substance having a temperature of 50° C. or below.

The reaction mixture comprising the prepolymer obtained in the first step desirably has a limiting viscosity number [η] of 0.1 to 0.4 dl/g and/or a hydroxyl group concentration of $1 \times 10^{-3}$ mol/g or below.

The reaction mixture comprising the high-molecular-weight (co)polycarbonate obtained in the third step desirably has a limiting viscosity number [η] of 0.3 to 1.0 dl/g and/or a hydroxyl group concentration of $5 \times 10^{-4}$ mol/g or below.

The prepolymer obtained in the first step desirably has a terminal hydroxyl group content of 50 molar % or below based on all the terminal groups of the prepolymer.

The high-molecular-weight (co)polycarbonate obtained in the third step desirably has a terminal hydroxyl group content of 20 molar % or below based on all the terminal groups of the high-molecular-weight (co)polycarbonate.

The dihydroxyl compound is preferably a compound selected from the group consisting of compounds represented by the following general formulas (1), (2), (3) and (4):

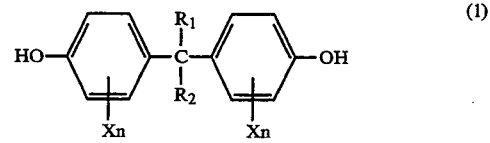

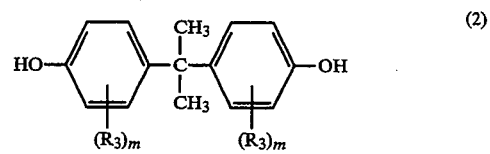

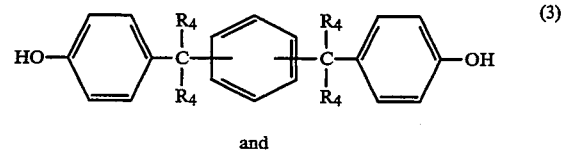

and

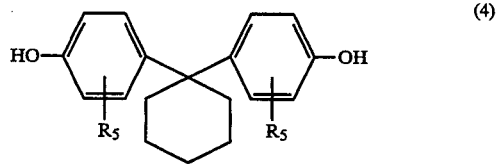

wherein $R_1$, $R_2$, $R_3$, $R_4$ and $R_5$ each represent a linear or branched alkyl group having 1 to 8 carbon atoms or a phenyl group, X represents a halogen atom, n represents 0 or an integer of 1 to 4, and m represents an integer of 1 to 4.

Two or more dihydroxy compounds selected from the group consisting of compounds represented by the above general formulas (1), (2), (3) and (4) may be used to prepare a copolycarbonate.

In general, various additives are added to a prepared polycarbonate. It is a common method for adding an additive to a polycarbonate that an additive is added to polycarbonate pellets and then an obtained mixture is melt-kneaded in an extruder. In this method, since the polycarbonate in a molten state is solidified once, the polycarbonate in a solid state must be melted before the additive is added thereto. There is a problem that the polycarbonate tends to suffer from deterioration by heating when the polycarbonate in a solid state is melted. However, in the process according to the present invention, an additive can be added to the (co)polycarbonate prepared in a molten state before conducting solidification thereof. Therefore, the problem in the prior art described above is not present in the process according to the present invention.

Thus, the present invention relates to a process for producing a (co)polycarbonate which comprises conducting a melt-polycondensation of a dihydroxy compound and a carbonic diester as monomers in the presence of a transesterification catalyst in a tank reactor, while removing a monohydroxy compound formed by the melt-polycondensation, thereby obtaining a reaction mixture comprising a prepolymer in a molten state (the first step), cooling the molten reaction mixture obtained in the first step to solidify it (the second step), conducting melt-polycondensation of the reaction mixture comprising the prepolymer in a horizontal polycondensation reactor, thereby obtaining a reaction mixture comprising a high-molecular-weight (co)polycarbonate (the third step), and adding an additive to the reaction mixture comprising the high-molecular-weight (co)polycarbonate in a molten state (the forth step).

The additive is preferably an organic phosphorus compound or a hindered phenol compound.

Boric acid or a borate may be added in the first step, the second step, the third step or the forth step.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

A concrete description will be made on the process for producing a polycarbonate according to the present invention hereinafter.

First, representative examples of the dihydroxy compounds will be described.

Examples of the bisphenols represented by the above formula (1) include 2,2-bis(4-hydroxyphenyl)propane, 2,2-bis(4-hydroxyphenyl)-4-methylpentane, 2,2-bis(4-hydroxyphenyl)octane, 4,4'-dihydroxy-2,2,2-triphenylethane and 2,2-bis(3,5-dibromo-4-hydroxyphenyl)propane.

Examples of the bisphenols represented by the above formula (2) include 2,2-bis(4-hydroxy-3-methylphenyl)propane, 2,2-bis(4-hydroxy-3-isopropylphenyl)propane, 2,2-bis(4-hydroxy-3-sec-butylphenyl)propane and 2,2-bis(4-hydroxy-3-tert-butylphenyl)propane.

Examples of the bisphenols represented by the above formula (3) include 1,1'-bis(4-hydroxyphenyl)-p-diisopropylbenzene and 1,1'-bis(4-hydroxyphenyl)-m-diisopropylbenzene.

Examples of the bisphenols represented by the above formula (4) include 1,1'-bis(4-hydroxyphenyl)cyclohexane.

Among them, 2,2-bis(4-hydroxyphenyl)propane is particularly preferred.

It is also possible to produce a copolycarbonate with the use of two or more dihydroxy compounds selected from the group consisting of compounds represented by the formulas (1), (2), (3) and (4).

Representative examples of the carbonic diesters include diphenyl carbonate, ditolyl carbonate, bis(chlorophenyl) carbonate, m-cresyl carbonate, dinaphthyl carbonate, diethyl carbonate, dimethyl carbonate, dibutyl carbonate and dicyclohexyl carbonate. Among them, diphenyl carbonate is particularly preferred.

For producing a (co)polycarbonate by the process of the present invention, the above-described carbonic diester is necessary in an amount equimolar to that of the dihydroxy compound present in the reaction system. Namely, to produce a (co)polycarbonate having a high molecular weight, usually 1 mol of a carbonate compound must be reacted with 1 mol of the dihydroxy compound. When diphenyl carbonate is used as the carbonic diester, 2 mol of phenol is formed by the reaction, which is distilled out of the reaction system. Since, however, when the formed monohydroxy compound, e.g., phenol, is distilled out of the reaction system in order to further conduct the reaction, the carbonic diester is also distilled out in some cases, it is desirable to use the carbonic diester in an amount of 1.01 to 1.5 mol, particularly 1.015 to 1.20 mol, per mol of the dihydric phenol.

A blocking agent such as a carbonic diester, an ester compound or a phenol compound can be added to the reaction system in the production of the (co)polycarbonate according to the present invention. The amount of the blocking agent to be used depends on the intended molecular weight of the (co)polycarbonate. The blocking agent is used in an amount of usually 0.05 to 10 molar %, preferably 1 to 5 molar %, based on the amount of the dihydroxy compound. When the carbonic diester is used as the blocking agent, it is added in the first step, the second step or the third step. When the ester compound or the phenol compound is used as the blocking agent, it is added in the second step or the third step, preferably in the third step.

The transesterification catalysts usable in the present invention include electron-donating amine compounds, alkali metal compounds, alkaline earth metal compounds and borates. Metals such as Na, K, Be, Ca, Sr, Ba, Zn, Cd, Al, Cr, Mo, Fe, Co, Ni, Ag, Au, Sn, Sb, Pb, Pt and Pd, and alcoholares, oxides, carbonates, acetates and hydrides of them are also usable.

Representative examples of the electron-donating amine compounds include 4-dimethylaminopyridine, 4-diethylaminopyridine, 4-pyrrolidinopyridine, 4-aminopyridine, 2-hydroxypyrldine, 4-hydroxypyridine, 2-methoxypyridine, 4-methoxypyridine, 2-methoxyimidazole, 1-methylimidazole, imidazole, aminoquinoline, 4-methylimldazole and diazabicyclooctane (DABCO).

Representative examples of the alkali metal compounds and alkaline earth metal compounds include sodium hydroxide, lithium hydroxide, potassium hydroxide, sodium hydrogencarbonate, lithium hydrogencarbonate, potassium hydrogencarbonate, sodium carbonate, lithium carbonate, potassium carbonate, sodium acetate, lithium acetate, potassium acetate, sodium stearate, lithium stearate, potassium stearate, sodium borohydride, lithium borohydride, potassium borohydride, sodium benzoate, lithium benzoate, potassium benzoate, barium hydroxide, calcium hydroxide, magnesium hydroxide, barium hydrogencarbonate, calcium hydrogencarbonate, magnesium hydrogencarbonate, barium carbonate, calcium carbonate, magnesium carbonate, barium acetate, calcium acetate, magnesium acetate, barium stearate, calcium stearate and magnesium stearate.

Representative examples of the borate include sodium diborate, sodium tetraborate, sodium pentaborate, sodium hexaborate, sodium octaborate, lithium metaborate, lithium tetraborate, lithium pentaborate, potassium metaborate, potassium tetraborate, potassium pentaborate, potassium hexaborate, potassium octaborate, ammonium metaborate, ammonium tetraborate, ammonium pentaborate, ammonium octaborate, ammonium borate, tetramethylammonium borate, aluminum potassium borate, cadmium borate, silver borate, copper borate, lead borate, nickel borate, magnesium borate and manganese borate.

These transesterification catalysts may be used either singly or in combination of two or more of them. The transesterification catalyst may be added together with the monomers in one lot or, alternatively, the catalyst may be added stepwise during the course of the reaction. When two or more transesterification catalysts are used, they may be added together or, alternatively, they may be added stepwise during the course of the reaction.

In the present invention, the transesterification catalyst used is preferably a compound selected from the group consisting of an electron-donating amine compound, an alkali metal compound and an alkaline earth metal compound, particularly preferably a combination of an electron-donating amine compound with an alkali metal compound and/or an alkaline earth metal compound. Alternatively, the transesterification catalyst used is preferably a borate.

The transesterification catalyst is used in an amount of $10^{-1}$ to $10^{-8}$ mol, preferably $10^{-2}$ to $10^{-7}$ mol, per mol of the dihydric phenol present in the reaction system. When the amount of the transesterification catalyst is below $10^{-8}$ mol, the catalytic effect is insufficient and the polymerization velocity of the (co)polycarbonate is low and, on the contrary, when it is above $10^{-1}$ mol, the relative amount of the catalyst remaining in the formed (co)polycarbonate is large to impair the properties of the (co)polycarbonate.

Next, a description will be made on the process for producing a (co)polycarbonate according to the present invention.

In the first step, a prepolymer is prepared from a dihydroxy compound and a carbonic diester by melt-polycondensation in a tank reactor.

The reaction temperature in the first step ranges from 60° C. to about 300° C., preferably from 130° C. to 280° C. When the temperature is below 130° C., the reaction velocity is low and, on the contrary, when it exceeds 280° C., side reactions tend to occur. The pressure in the reactor ranges from atmospheric pressure to 0.1 Torr during the course of the reaction. When the pressure is above this range, it is impossible to efficiently remove the by-product monohydroxy compound and, on the contrary, when it is below this range, the carbonic diester and/or dihydroxy compound as monomers is distilled off to change the molar ratio of the reactive terminals, thereby making the final production of a (co)polycarbonate having an intended, high molecular weight difficult. In order to inhibit the distillation of the monomer(s), it is preferred that the first polycondensation reactor for producing a prepolymer have a rectification column.

Although any material which is usually used for chemical apparatus, such as stainless steel, is usable for the tank reactor used in the first step, it is preferred that the reactor surface to be brought into contact with the reaction solution is made of a material containing at least one of nickel, chromium and glass in an amount of 60% or above in order to obtain a colorless resin having a high molecular weight.

The limiting viscosity number of the reaction mixture comprising a prepolymer obtained in the first step is preferably 0.1 to 0.4 dl/g as determined by a solution thereof in methylene chloride at 20° C., in order to obtain finally (i.e., in the third step) an intended resin having a high molecular weight. When the limiting viscosity number is below 0.1 dl/g, a long reaction time is taken in the third step in order to obtain an intended resin having a high molecular weight. Since a tank reactor is used in the first step, it is difficult to obtain a reaction mixture comprising a prepolymer having a high molecular weight, i.e., a reaction mixture having a limiting viscosity number of above 0.4 dl/g, in a short period of time.

The hydroxyl group concentration of the reaction mixture comprising the prepolymer obtained in the first step is preferably $1 \times 10^{-3}$ mol/g or below. In the reaction mixture obtained in the first step, various compounds having a hydroxyl group(s) are contained. Namely, compounds having a phenolic OH group or an alcoholic OH group, such as the intended prepolymer, the oligomer, the dihydroxy compound which is one of the monomers, the monohydroxy compound formed as the by-product and, if added, the blocking agent, are contained in the reaction mixture obtained in the first step. All the hydroxyl groups of the above-described compounds having a OH group contributes to the hydroxyl group concentration. When the hydroxy group concentration is above $1 \times 10^{-3}$ mol/g, the formed prepolymer decomposes at a high temperature in the third step. The decomposition reaction makes it difficult to finally produce an intended resin having a high molecular weight. Further, the crosslinking reaction proceeds at the terminal of the decomposition product thus formed or the product is colored, unfavorably. The hydroxyl group concentration is determined with a Fourier Transfer Infrared Spectroscope Analyzer.

The terminal hydroxyl group content of the prepolymer is preferably 50 molar % or below based on all the terminals of the prepolymer obtained in the first step. When it is above 50 molar %, the prepolymer unfavorably decomposes at a high temperature as described above. The terminal hydroxyl group content of the prepolymer is determined by $^{13}C$-NMR spectrometry. The terminal hydroxyl group content of the prepolymer can be determined by the $^{13}C$-NMR spectrometry when the reaction mixture comprising the prepolymer is used as the sample.

In the second step, the molten reaction mixture comprising the prepolymer obtained in the first step is cooled to solidify it.

The reaction mixture comprising the prepolymer obtained in the first step is taken out of the tank reactor by opening a valve at a lower part of the tank reactor. The term "valve" herein includes not only valves such as a ball valve, a flush valve and a gate valve but also resin-feeding means such as a gear pump. It is also possible to connect the valve in line with the gear pump. Further, a die may be connected to the head of the valve in order to take out the prepolymer in the form of a strand.

In the second step, the reaction mixture comprising the prepolymer discharged from the tank reactor is immediately cooled to convert the molten state into a solid state. Although the molten reaction mixture can be cooled by exposing it to air of room temperature, the prepolymer in the reaction mixture tends to be oxidized by oxygen in air to exert bad influences such that the ( co ) polycarbonate to be finally obtained is colored and that no high molecular weight can be achieved. In another cooling method, an inert substance of 50° C. or below is used. When the temperature of this substance is above 50° C., no sufficient cooling effect can be achieved in a short period of time. The inert substances usable herein include nitrogen, helium, neon, argon and water. Among them, nitrogen is most desirable. Examples of the method for cooling the reaction mixture include one wherein the reaction mixture is placed in a gaseous inert substance, and another one wherein a cooling medium, such as water, is run out of a vessel filled with the reaction mixture.

The cooled reaction mixture is preferably pulverized so that it can be quantitatively fed into a horizontal polycondensation reactor. When the reaction mixture is passed through a die, it is preferably pelletized by one of the following two methods: one of them comprises cooling the strand formed by passing through a die and cutting the strand with a cutter to obtain pellets. In this method, the cutting is preferably conducted in an inert substance, too. The other method comprises cutting the reaction mixture with a device in which a cutter is directly connected to a die to form pellets. In this method, the reaction mixture from the die is immediately cut with the cutter before it has been completely cooled (hot cut). The pellets thus obtained by cutting are sufficiently cooled in the inert substance. The prepolymer pellets thus obtained are dried in a solid state at around room temperature, held as they are and quantitatively fed into the horizontal polycondensation reactor through a feeder. The reaction mixture comprising the prepolymer is preferably fed into a horizontal polycondensation reactor in a solid state. Alternatively, the solid reaction mixture comprising the prepolymer may be molten before being feed into the horizontal polycondensation reactor in order to feed it thereto in a molten state.

In the third step, a high-molecular-weight (co)polycarbonate is prepared from the prepolymer by melt-polycondensation in a horizontal polycondensation reactor.

In this step, when the reaction mixture comprising the solid prepolymer is fed into the horizontal polycondensation reactor, first the reaction mixture is melted by heating at a suitable temperature.

The reaction temperature of the melt-polycondensation ranges from 200° C. to about 310° C., preferably from 220° C. to 300° C. When the reaction temperature is below 220° C., the reaction velocity is low and the melt viscosity of the (co)polycarbonate is so high as to make an efficient removal of the by-product monohydroxy compound difficult. When it is above 300° C., side reactions tend to occur.

The pressure in the reactor is 10 Torr or below, preferably 1Torr or below and still preferably 0.5 Torr or below, during the course of the reaction. When the pressure is too high, it is impossible to efficiently remove the by-product monohydroxy compound.

Although any material which is used for usual chemical apparatuses, such as stainless steel, is usable for the horizontal polycondensation reactor like for the tank reactor in the first step, it is preferred that the reactor surface to be brought into contact with the reaction solution be made of a material containing at least one of nickel, chromium and glass in an amount of 60% or above in order to obtain a colorless (co)polycarbonate having a high molecular weight.

The limiting viscosity number of tile reaction mixture comprising a (co)polycarbonate obtained in the third step is preferably 0.3 to 1.0 dl/g as determined by a solution thereof in methylene chloride at 20° C.

The hydroxyl group concentration of the reaction mixture comprising the (co)polycarbonate obtained in the third step is preferably $5 \times 10^{-4}$ mol/g or below. When the hydroxy group concentration is above $5 \times 10^{-4}$ mol/g, the (co)polycarbonate product finally obtained is colored, the mechanical strength thereof is low and the thermal stability thereof is poor. The hydroxyl group concentration of the reaction mixture comprising the (co)polycarbonate is determined with a Fourier Transfer Infrared Spectroscope Analyzer.

The terminal hydroxyl group content of the (co)polycarbonate obtained in the third step is preferably 20 molar % or below based on all the terminals of tile (co)polycarbonate obtained in the third step. When it is above 20 molar %, bad influences are exerted on the final product as described above. The terminal hydroxyl group content is determined in the same manner as that of the prepolymer obtained in the first step.

If necessary, various additives can be added to the reaction mixture comprising the high-molecular-weight (co)polycarbonate obtained in the third step in a molten state (the forth step). Representative processes for adding an additive to the reaction mixture comprising the high-molecular-weight (co)polycarbonate includes one wherein an extruder having a feeder through which an additive can be fed into the extruder is connected to the outlet of the horizontal polycondensation reactor with a pipe, the reaction mixture comprising the high-molecular-weight (co)polycarbonate is fed into the extruder while the additive is continuously fed into the extruder through the feeder, and the resulting mixture of the reaction mixture comprising the high-molecular-weight (co)polycarbonate with the additive is kneaded by the extruder.

Examples of the additives include heat stabilizers, light stabilizers, ultraviolet ray absorbers, hue improvers, pigments and improvers for molding properties. Examples of the heat stabilizers include organic phosphorus compounds and hindered phenol compounds. Examples of the light stabilizers include hindered amine compounds, and examples of the ultraviolet ray absorbers include benzotriazol compounds.

Representative examples of the organic phosphorus compounds usable in the present invention include triethyl phosphite, triisopropyl phosphite, triisodecyl phosphite, tridodecyl phosphite, phenyl diisodecyl phosphite, diphenyl isodecyl phosphite, triphenyl phosphite, tristolyl phosphite, phenyl bis(4-nonylphenyl) phosphite, tris(4-octylphenyl) phosphite, tris(4-(1-phenylethyl)phenyl) phosphite, tris(2,4-di-t-butylphenyl) phosphite, tetrakis(2,4-di-t-butylphenyl) 4,4'-biphenylenediphosphonite represented by the following formula:

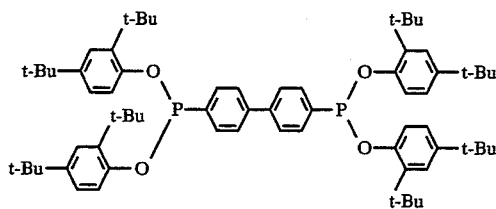

pentaerythritol di[(2,6-di-t-butyl-4-methylphenyl) phosphite] represented by the following formula:

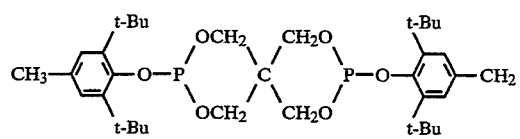

pentaerythritol di[(2,4-di-t-butylphenyl) phosphite] represented by the following formula:

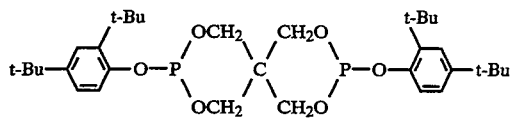

tetrakis(2,4-di-t-butylphenyl) 4,4'-(2,2-diphenylpropane)phosphonite represented by the following formula:

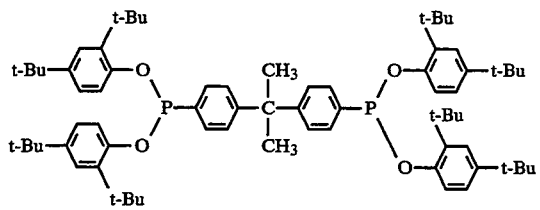

and dialkylphenylphosphites represented by the following formula:

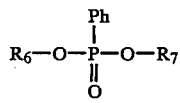

wherein $R_6$ and $R_7$ each represent a linear or branched alkyl group having 1 to 20 carbon atoms; and Ph represents a phenyl group.

The amount of the organic phosphorus compound to be used is preferably 10 to 1,000 ppm based on the amount of the dihydric phenol. The addition thereof in an amount of less than 10 ppm is ineffective in improving the heat stability of the resulting (co)polycarbonate, while that in an amount exceeding 1,000 ppm exerts an adverse effect on the physical properties of the resulting (co)polycarbonate, unfavorably.

Representative examples of the hindered phenol compounds usable in the present invention include octadecyl 3-(3,5-di-t-butyl-4-hydroxyphenyl)propionate, N,N'-hexamethylenebis(3,5-di-t-butyl-4-hydroxyhydrocinnamamide), triethylene glycol bis[3-(3-t-butyl-5-methyl-4-hydroxyphenyl)propionate], 1,6-hexanediol bis[3-(3,5-di-t-butyl-4-hydroxyphenyl)propionate], pentaerythritol tetrakis[3-(3,5-di-t-butyl-4-hydroxyphenyl)propionate], diethyl 3,5-di-t-butyl-4-hydroxy-benzylphosphonate, and compounds represented by the following formulas (A) to (C):

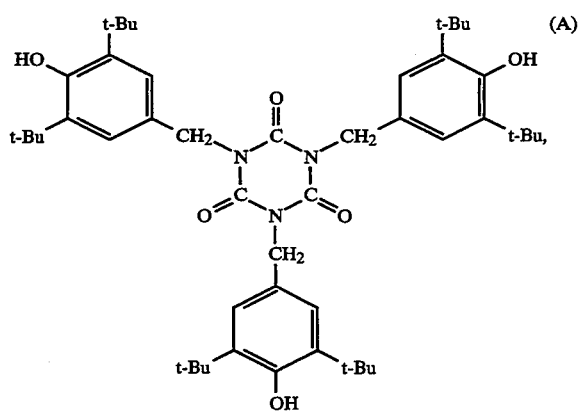

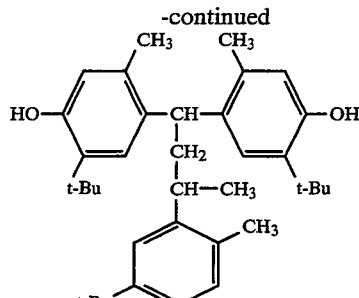

and

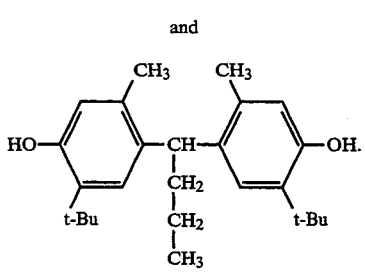

The hindered phenol compound is preferably added in an amount of 10 to 2,000 ppm based on the amount of the dihydric phenol. The addition thereof in an amount of less than 10 ppm is ineffective in improving the heat stability of the resulting (co)polycarbonate, while that in an amount exceeding 2,000 ppm exerts an adverse effect on the physical properties of the resulting (co)polycarbonate.

Representative examples of the hindered amine compounds usable in the present invention include bis(2,2,6,6-tetramethyl-4-piperidyl)sebacate, bis(2,2,6,6-tetramethyl-4-piperidinyl)succinate and bis(1,2,2,6,6-pentamethyl-4-piperidyl) 2-(3,5-di-t-butyl-4-hydroxybenzyl)-2-n-butylmalonate.

Representative examples of the benzotriazol compounds usable in the present invention include 2-(5-methyl-2-hydroxyphenyl)benzotriazol, 2-(3,5-di-t-butyl-2-hydroxyphenyl)benzotriazol, 2-(3-t-butyl-5-methyl-2-hydroxyphenyl)-5-chlorobenzotriazol and 2-(2'-hydroxy-5'-t-octylphenyl)benzotriazol.

The additives described herein may be used singly or in a combination of two or more of them.

In the present invention, boric acid or a borate may be added in the first step, the second step, the third step or the forth step. Boric acid and borates deactivate the basic catalyst(s) contained in the reaction mixture, thereby to stabilize the (co)polycarbonate. The amount of the boric acid or the borate to be used is preferably $1 \times 10^{-2}$ to $1 \times 10^3$ mol per mol of the catalyst used. The addition thereof in an amount of less than $1 \times 10^{-2}$ mol is ineffective in improving the heat stability of the resulting (co)polycarbonate, while that in an amount exceeding $1 \times 10^3$ mol exerts unfavorably an adverse effect on the degree of polymerization of the resulting (co)polycarbonate. That is, a (co)polycarbonate having an intended high molecular weight can not be obtained.

Examples of the borates usable in the present invention include triphenyl borate, trimethyl borate, triethyl borate, butyl borate and tritolyl borate.

A linear (co)polycarbonate having excellent thermal resistance, hue and impact resistance and a high molecular weight can be produced by the process according to the present invention.

EXAMPLES

The present invention will now be described in more detail with reference to the following Examples which should not be considered to limit the scope of the present invention.

First, a description will be made on the methods for the determination and evaluation of the limiting viscosity number $[\eta]$, viscosity-average molecular weight (Mv), hue, hydroxyl group concentration and terminal hydroxyl group content based on all the terminal groups in the following Examples and Comparative Examples.

Limiting viscosity number $[\eta]$:

The limiting viscosity number of the solution of the reaction mixture comprising the prepolymer or the (co)polycarbonate in methylene chloride was determined with an Ubbelohde's viscometer at 20° C. The concentration of the reaction mixture in the solution was 0.5 g/dl.

Viscosity-average molecular weight (Mv):

The viscosity-average molecular weight of the prepolymer or the (co)polycarbonate was calculated from the limiting viscosity number $[\eta]$ determined as described above according to the following formula:

$$[\eta] = 1.11 \times 10^{-4} \, Mv^{0.82}$$

Hue:

The hue was evaluated by determining a difference in the absorbances of a 10 wt. % solution of the reaction mixture comprising the prepolymer or the (co)polycarbonate in methylene chloride at 380 nm and 580 nm by UV spectrometry.

Hydroxyl group concentration:

The reaction mixture comprising the prepolymer or the (co)polycarbonate was dissolved in chloroform to prepare a 5 wt. % solution thereof and the absorbance of the solution at around $3.600 \, cm^{-1}$ was measured with a Fourier Transfer Infrared (FT-IR) Spectroscope Analyzer (mfd. by Shimadzu Corporation) to determine the hydroxyl group concentration.

Terminal hydroxyl group concentration of prepolymer or (co)polycarbonate based on all the terminal groups thereof:

The reaction mixture comprising the prepolymer or the (co)polycarbonate was dissolved in heavy chloroform to prepare a 5 wt. % solution thereof. The terminal hydroxyl group concentration was determined with the solution according to $^{13}$C-NMR spectrometry.

EXAMPLE 1

4.57 kg (20 mol) of 2,2-bis(4-hydroxyphenyl)propane, 4.89 kg (20.5 mol) of diphenyl carbonate and 0.489 g (0.004 mol) of 4-dimethylaminopyridine were fed into a 20-l Hastelloy tank reactor, melted at 160° C. in nitrogen and thoroughly stirred. The temperature was gradually elevated to 260° C. while the pressure was gradually reduced to 1 Torr to advance the reaction while distilling off the formed phenol, thereby obtaining a reaction mixture comprising a prepolymer. The reaction mixture comprising the prepolymer had a limiting viscosity number $[\eta]$ of dl/g, a hue value ($A_{380}$–$A_{580}$) of 0.06 and a hydroxyl group concentration of $4 \times 10^{-4}$ mol/g. The prepolymer had a viscosity-average molecular weight (Mv) of 15,300 and a terminal hydroxyl group concentration of 40 molar % based on all the terminal groups of the prepolymer.

Next, the reaction mixture was transferred from the lower part of the reactor into an apparatus through a ball valve, gear pump and die, and cut into pellets with a cutter directly connected to the die in a nitrogen atmosphere at room temperature in the apparatus. The pellets were kept out of contact with air until they had been sufficiently cooled with nitrogen.

Then, the pellets were fed into a horizontal polycondensation reactor in which the temperature and pressure were adjusted to 280° C. and 0.1 Torr, respectively, to conduct a reaction. The residence time was 50 min. The resultant reaction mixture comprising a polycarbonate was colorless and transparent. It had a hue value ($A_{380}$–$A_{580}$) of 0.09, a limiting viscosity number $[\eta]$ of 0.5 dl/g and a hydroxyl group concentration of $6 \times 10^{-6}$ mol/g. The polycarbonate had a viscosity-average molecular weight (Mv) of 28,500 and a terminal hydroxyl group concentration of 15 molar % based on all the terminal groups of the polycarbonate.

EXAMPLE 2

The reaction was conducted under the same conditions as those of Example 1 except that $2 \times 10^{-4}$ mol of potassium acetate was used in place of the 4-dimethylaminopyridine as the transesterification catalyst to prepare a prepolymer, i.e., to obtain a reaction mixture comprising a prepolymer. The reaction mixture comprising the prepolymer had a limiting viscosity number $[\eta]$ of 0.27 dl/g, a hue value ($A_{380}$–$A_{580}$) of 0.06 and a hydroxyl group concentration of $6 \times 10^{-4}$ mol/g. The prepolymer had a viscosity-average molecular weight (Mv) of 13,500 and a terminal hydroxyl group concentration of 40 molar % based on all the terminal groups of the prepolymer.

Next, the reaction mixture was taken out of the lower part of the reactor through a ball valve, gear pump and die to obtain a strand in a vessel filled with nitrogen at room temperature. The strand was then fed into a pelletizer under cooling with nitrogen to obtain pellets.

Then, the pellets were fed into a horizontal polycondensation reactor in which the temperature and pressure were adjusted to 280° C. and 0.1 Torr, respectively, to conduct the reaction. The residence time was 50 min. The resultant reaction mixture comprising a polycarbonate was colorless and transparent. It had a hue value ($A_{380}$–$A_{580}$) of 0.09, a limiting viscosity number $[\eta]$ of 0.47 dl/g and a hydroxyl group concentration of $8 \times 10^{-5}$ mol/g. The polycarbonate had a viscosity-average molecular weight (Mv) of 26,500 and a terminal hydroxyl group concentration of 17 molar % based on all the terminal groups of the polycarbonate.

EXAMPLE 3

The reaction was conducted under the same conditions as those of Example 1 except that 0.068 g ($1 \times 10^{-3}$ mol) of imidazole was used in place of the 4-dimethylaminopyridine as the transesterification catalyst to prepare a prepolymer, i.e., to obtain a reaction mixture comprising a prepolymer. The reaction mixture comprising the prepolymer had a limiting viscosity number $[\eta]$ of 0.26 dl/g, a hue value ($A_{380}$–$A_{580}$) of 0.06 and a hydroxyl group concentration of $8 \times 10^{-4}$ mol/g. The prepolymer had a viscosity-average molecular weight (Mv) of 12,900 and a terminal hydroxyl group concentration of 43 molar % based on all the terminal groups of the prepolymer.

Next, the reaction mixture was taken out of the lower part of the reactor through a ball valve, gear pump and die to obtain a strand in a vessel filled with nitrogen at room temperature. The strand was then fed into a pelletizer under cooling with nitrogen to obtain pellets.

Then, the pellets were fed into a horizontal polycondensation reactor in which the temperature and pressure were adjusted to 280° C. and 0.1 Torr, respectively, to conduct the reaction. The residence time was 50 min. The resultant reaction mixture comprising a polycarbonate was colorless and transparent. It had a hue value ($A_{380}$–$A_{580}$) of 0.09, a limiting viscosity number [$\eta$] of 0.38 dl/g and a hydroxyl group concentration of $9 \times 10^{-5}$ mol/g. The polycarbonate had a viscosity-average molecular weight (Mv) of 20,400 and a terminal hydroxy group concentration of 19 molar % based on all the terminal groups of the polycarbonate.

EXAMPLE 4

The reaction was conducted under the same conditions as those of Example 1 except that 0.489 g (0.004 mol) of 4-dimethylaminopyridine and 0.098 mg ($1 \times 10^{-6}$ mol) of potassium acetate were used as the transesterification catalysts to prepare a prepolymer, i.e., to obtain a reaction mixture comprising a prepolymer. The reaction mixture comprising the prepolymer had a limiting viscosity number [$\eta$] of 0.28 dl/g, a hue value ($A_{380}$–$A_{580}$) of 0.07 and a hydroxyl group concentration of $4 \times 10^{-4}$ mol/g. The prepolymer had a viscosity-average molecular weight (Mv) of 14,100 and a terminal hydroxyl group concentration of 35 molar % based on all the terminal groups of the prepolymer.

Next, the reaction mixture was taken out of the lower part of the reactor through a ball valve, gear pump and die to obtain a strand in a vessel filled with nitrogen at room temperature. The strand was then fed into a pelletizer under cooling with nitrogen to obtain pellets.

Then, the pellets were fed into a horizontal polycondensation reactor in which the temperature and pressure were adjusted to 280° C. and 0.1 Torr, respectively, to conduct the reaction. The residence time was 50 min. The resultant reaction mixture comprising a polycarbonate was colorless and transparent. It had a hue value ($A_{380}$–$A_{580}$) of 0.09, a limiting viscosity number [$\eta$] of 0.45 dl/g and a hydroxyl group concentration of $7 \times 10^{-6}$ mol/g. The polymer had a viscosity-average molecular weight (Mv) of 25,100 and a terminal hydroxyl group concentration of 14 molar % based on all the terminal groups of the polycarbonate.

EXAMPLE 5

The reaction was conducted under the same conditions as those of Example 1 except that 0.055 mg ($1.44 \times 10^{-4}$ mol) of sodium tetraborate was used in place of the 4-dimethylaminopyridine as the transesterification catalyst to prepare a prepolymer, i.e., to obtain a reaction mixture comprising a prepolymer. The reaction mixture comprising the prepolymer had a limiting viscosity number [$\eta$] of 0.30 dl/g, a hue value ($A_{380}$–$A_{580}$) of 0.07 and a hydroxyl group concentration of $5 \times 10^{-4}$ mol/g. The prepolymer had a viscosity-average molecular weight (Mv) of 15,300 and a terminal hydroxyl group concentration of 40 molar % based on all the terminal groups of the prepolymer.

Next, the reaction mixture was taken out of the lower part of the reactor through a ball valve, gear pump and die to obtain a strand in a vessel filled with nitrogen at room temperature. The strand was then fed into a pelletizer under cooling with nitrogen to obtain pellets.

Then, the pellets were fed into a horizontal polycondensation reactor in which the temperature and pressure were adjusted to 280° C. and 0.1 Torr, respectively, to conduct the reaction. The residence time was 50 min. The resultant reaction mixture comprising a polycarbonate was colorless and transparent. It had a hue value ($A_{380}$–$A_{580}$) of 0.10, a limiting viscosity number [$\eta$] of 0.50 dl/g and a hydroxyl group concentration of $7 \times 10^{-6}$ mol/g. The polymer had a viscosity-average molecular weight (Mv) of 28,500 and a terminal hydroxyl group concentration of 20 molar % based on all the terminal groups of the polycarbonate.

EXAMPLE 6

The reaction was conducted under the same conditions as those of Example 1 except that 2.47 g (0.04 mol) of boric acid was fed into the tank reactor together with the monomers and the catalyst to prepare a prepolymer, i.e., to obtain a reaction mixture comprising a prepolymer. The reaction mixture comprising the prepolymer had a limiting viscosity number [$\eta$] of 0.31 dl/g, a hue value ($A_{380}$–$A_{580}$) of 0.08 and a hydroxyl group concentration of $5 \times 10^{-4}$ mol/g. The prepolymer had a viscosity-average molecular weight (Mv) of 15,900 and a terminal hydroxyl group concentration of 40 molar % based on all the terminal groups of the prepolymer.

Next, the reaction mixture was taken out of the lower part of the reactor through a ball valve, gear pump and die to obtain a strand in a vessel filled with nitrogen at room temperature. The strand was then fed into a pelletizer under cooling with nitrogen to obtain pellets.

Then, the pellets were fed into a horizontal polycondensation reactor in which the temperature and pressure were adjusted to 280° C. and 0.1 Torr, respectively, to conduct the reaction. The residence time was 50 min. The resultant reaction mixture comprising a polycarbonate was colorless and transparent. It had a hue value ($A_{380}$–$A_{580}$) of 0.10, a limiting viscosity number [$\eta$] of 0.50 dl/g and a hydroxyl group concentration of $7 \times 10^{-6}$ mol/g. The polymer had a viscosity-average molecular weight (Mv) of 28,500 and a terminal hydroxyl group concentration of 20 molar % based on all the terminal groups of the polycarbonate.

EXAMPLE 7

The reaction was conducted under the same conditions as those of Example 1 except that 23.21 g (0.08 mol) of triphenyl borate was fed into the tank reactor together with the monomers and the catalyst to prepare a prepolymer, i.e., to obtain a reaction mixture comprising a prepolymer. The reaction mixture comprising the prepolymer had a limiting viscosity number [$\eta$] of 0.26 dl/g, a hue value ($A_{380}$–$A_{580}$) of 0.07 and a hydroxyl group concentration of $5 \times 10^{-4}$ mol/g. The prepolymer had a viscosity-average molecular weight (Mv) of 12,900 and a terminal hydroxyl group concentration of 40 molar % based on all the terminal groups of the prepolymer.

Next, the reaction mixture was taken out of the lower part of the reactor through a ball valve, gear pump and die to obtain a strand in a vessel filled with nitrogen at room temperature. The strand was then fed into a pelletizer under cooling with nitrogen to obtain pellets.

Then, the pellets were fed into a horizontal polycondensation reactor in which the temperature and pressure were adjusted to 280° C. and 0.1 Torr, respectively, to conduct the reaction. The residence time was 50 min. The resultant reaction mixture comprising a polycarbonate was colorless and transparent. It had a hue value ($A_{380}$–$A_{580}$) of 0.10, a limiting viscosity number [$\eta$] of 0.44 dl/g and a hydroxyl group concentration of $8 \times 10^{-6}$ mol/g. The polymer had a viscosity-average molecular weight (Mv) of 24,400 and a terminal hydroxyl group concentration of 19 molar % based on all the terminal groups of the polycarbonate.

EXAMPLE 8

The reaction was conducted under the same conditions as those of Example 1 except that 5 molar %, based on 2,2-bis(4-hydroxypheny)propane, of phenyl benzoate as the blocking agent was added in the initial stage of the reaction to prepare a prepolymer, i.e., to obtain a reaction mixture comprising a prepolymer. The reaction mixture comprising the prepolymer had a limiting viscosity number [$\eta$] of 0.25 dl/g, a hue value ($A_{380}$–$A_{580}$) of 0.06 and a hydroxyl group concentration of $9 \times 10^{-5}$ mol/g. The prepolymer had a viscosity-average molecular weight (Mv) of 12,300 and a terminal hydroxyl group concentration of 15 molar % based on all the terminal groups of the prepolymer.

The reaction mixture comprising the prepolymer was taken out of the lower part of the reactor through a ball valve, gear pump and die to obtain a strand in a vessel filled with nitrogen at room temperature. The strand was then fed into a pelletizer under cooling with nitrogen to obtain pellets.

Then, the pellets were fed into a horizontal polycondensation reactor in which the temperature and pressure were adjusted to 280° C. and 0.1 Torr, respectively, to conduct the reaction. The residence time was 50 min. The resultant reaction mixture comprising a polycarbonate was colorless and transparent. It had a hue value ($A_{380}$–$A_{580}$) of 0.09, a limiting viscosity number [$\eta$] of 0.42 dl/g and a hydroxyl group concentration of $7 \times 10^{-6}$ mol/g. The polycarbonate had a viscosity-average molecular weight (Mv) of 23,100 and a terminal hydroxyl group concentration of 5 molar % based on all the terminal groups of the polycarbonate.

EXAMPLE 9

The reaction was conducted under tile same conditions as those of Example 1 except that 2.28 kg (10 mol) of 2,2-bis(4-hydroxyphenyl)propane and 3.40 kg (10 mol) of 2,2-bis(4-hydroxy-3-tert-butylphenyl)propane were used as the dihydroxy compounds to prepare a prepolymer, i.e., to obtain a reaction mixture comprising a prepolymer. The reaction mixture comprising the prepolymer had a limiting viscosity number [$\eta$] of 0.30 dl/g, a hue value ($A_{380}$–$A_{580}$) of 0.06 and a hydroxyl group concentration of $9 \times 10^{-5}$ mol/g. The prepolymer had a viscosity-average molecular weight (Mv) of 15,300 and a terminal hydroxyl group concentration of 15 molar % based on all the terminal groups of the prepolymer.

The reaction mixture was taken out of the lower part of the reactor through a ball valve, gear pump and die to obtain a strand in a vessel filled with nitrogen at room temperature. The strand was then fed into a pelletizer under cooling with nitrogen to obtain pellets.

Then, the pellets were fed into a horizontal polycondensation reactor in which tile temperature and pressure were adjusted to 280° C. and 0.1 Torr, respectively to conduct the reaction. The residence time was 50 min. The resultant reaction mixture was colorless and transparent. It had a hue value ($A_{380}$ –$A_{580}$) of 0.09, a limiting viscosity number [$\eta$] of 0.41 dl/g and a hydroxyl group concentration of $7 \times 10^{-6}$ mol/g. The copolycarbonate had a viscosity-average molecular weight (Mv) of 22,400 and a terminal hydroxyl group concentration of 16 molar % based on all the terminals of the copolycarbonate.

EXAMPLE 10

The molten reaction mixture comprising the polycarbonate prepared in the same manner as that of Example 1 as such (without cooling and solidification) was transferred into an extruder having a side feeder. Simultaneously, master pellets comprising the reaction mixture and tris(2,4-di-t-butylphenyl)phosphite were fed into the extruder through the side feeder of the extruder continuously to conduct kneading. The amount of the tris(2,4-di-t-butyl-phenyl)phosphite was adjusted to be 100 ppm in the mixture finally obtained. The mixture was taken out of from the extruder through a die which was connected to the head of the extruder, to obtain a strand. The strand was then pelletized. The mixture finally obtained was colorless and transparent. It had a hue value ($A_{380}$–$A_{580}$) of 0.09, a limiting viscosity number [$\eta$] of 0.51 dl/g and a hydroxyl group concentration of $6 \times 10^{-6}$ mol/g. The polycarbonate had a viscosity-average molecular weight (Mv) of 28,500 and a terminal hydroxyl group concentration of 15 molar % based on all the terminal groups of the polycarbonate.

EXAMPLE 11

The molten reaction mixture comprising the polycarbonate prepared in the same manner as that of Example 2 as such (without cooling and solidification) was transferred into an extruder having a side feeder. Simultaneously, master pellets comprising the reaction mixture, trisphenyl phosphite and triethylene glycol bis[3-(3-t-butyl-5-methyl-4-hydroxyphenyl)propionate were fed into the extruder through the side feeder of the extruder continuously to conduct kneading. The amounts of the trisphenyl phosphite and triethylene glycol bis[3-(3-t-butyl-5-methyl-4-hydroxyphenyl)propionate were adjusted to be 100 ppm and 400 ppm, respectively, in the mixture finally obtained. The mixture was taken out of from the extruder through a die which was connected to the head of the extruder, to obtain a strand. The strand was then pelletized. The mixture finally obtained was colorless and transparent. It had a hue value ($A_{380}$–$A_{580}$) of 0.09, a limiting viscosity number [$\eta$] of 0.47 dl/g and a hydroxyl group concentration of $8 \times 10^{-5}$ mol/g. The polycarbonate had a viscosity-average molecular weight (Mv) of 26,500 and a terminal hydroxyl group concentration of 17 molar % based on all the terminal groups of the polycarbonate.

EXAMPLE 12

The molten reaction mixture comprising the polycarbonate prepared in the same manner as that of Example 1 was cooled to solidify it, thereby obtaining the reaction mixture in the form of a pellet. The pellets were quantitatively fed into an extruder having a side feeder through a hopper. Simultaneously, master pellets comprising the reaction mixture and tris(2,4-di-t-butyl-phenyl)phosphite were fed into the extruder through the side feeder of the extruder continuously to conduct kneading. The amount of the tris(2,4-di-t-butyl-phenyl)phosphite was adjusted to be 100 ppm in the mixture finally obtained. The mixture was taken out of from the extruder through a die which was connected to the head of the extruder, to obtain a strand. The strand was then pelletized. The mixture finally obtained was pale-yellow and transparent. It had a hue value ($A_{380}-A_{580}$) of 0.17, a limiting viscosity number [$\eta$] of 0.5 dl/g and a hydroxyl group concentration of $7 \times 10^{-6}$ mol/g. The polycarbonate had a viscosity-average molecular weight (Mv) of 26,500 and a terminal hydroxyl group concentration of 19 molar % based on all the terminal groups of the polycarbonate.

COMPARATIVE EXAMPLE 1

The reaction was conducted in the same manner as that of Example 1 to prepare a prepolymer, i.e., to obtain a reaction mixture comprising a prepolymer. The reaction mixture comprising the prepolymer had a hue value ($A_{380}-A_{580}$) of 0.06. The reaction mixture thus obtained was transferred as such, i.e., in a molten state, into a horizontal polycondensation reactor through a metal pipe fixed to the lower part of the tank reactor.

Then, the polycondensation was conducted with the molten reaction mixture transferred in the horizontal polycondensation reactor in which the temperature and pressure were adjusted to 280° C. and 0.1 Torr, respectively. The residence time was 50 min. The resultant reaction mixture comprising a polycarbonate was yellow. It had a hue value ($A_{380}-A_{580}$) of 0.26, a limiting viscosity number [$\eta$] of 0.33 dl/g and a hydroxyl group concentration of $6 \times 10^{-4}$ mol/g. The polycarbonate had a viscosity-average molecular weight (Mv) of 17,200 and a terminal hydroxyl group concentration of 25 molar % based on all the terminal groups of the polycarbonate.

The reaction mixture comprising the prepolymer, which was not transferred but held in the tank reactors, was colored pale yellow and had a hue value ($A_{380}-A_{580}$) of 0.18 two hours after the initiation of the polycondensation of the prepolymer in the horizontal polycondensation reactor.

COMPARATIVE EXAMPLE 2

The reaction was conducted in the same manner as that of Example 3 to prepare a prepolymer, i.e., to obtain a reaction mixture comprising a prepolymer. The reaction mixture thus obtained was transferred as such, i.e., in a molten state, into a horizontal polycondensation reactor through a metal pipe fixed to the lower part of the tank reactor.

Then, polycondensation was conducted with the molten reaction mixture transferred in the horizontal polycondensation reactor in which the temperature and pressure were adjusted to 280° C. and 0.1 Torr, respectively. The residence time was 50 min. The resultant reaction mixture comprising a polycarbonate was red. It had a hue value ($A_{380}-A_{580}$) of 0.25, a limiting viscosity number [$\eta$] of 0.34 dl/g and a hydroxyl group concentration of $2 \times 10^{-4}$ mol/g. The polycarbonate had a viscosity-average molecular weight (Mv) of 17,800 and a terminal hydroxyl group concentration of 30 molar % based on all the terminal groups of the polycarbonate.

The reaction mixture comprising the prepolymer, which was not transferred but held in the tank reactor, was colored light red and had a hue value ($A_{380}-A_{580}$) of 0.19 two hours after the initiation of the polycondensation of the prepolymer in the horizontal polycondensation reactor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A process for producing a (co)polycarbonate which comprises:
   a first step of conducting melt-polycondensation of a dihydroxy compound and a carbonic diester as monomers in the presence of a transesterification catalyst selected from the group consisting of an electron-donating amine compound, an alkali metal compound, an alkaline earth metal compound and a borate in a tank reactor and at a temperature of from 60° C. to about 300° C. and a pressure from atmospheric to 0.1 Torr, while removing a monohydroxy compound formed by the melt-polycondensation, thereby obtaining a molten reaction mixture comprising a prepolymer in a molten state and having a limiting viscosity number of 0.1 to 0.4 dl/g;
   a second step of cooling the molten reaction mixture to a solid state; and
   a third step of conducting melt-polycondensation of the reaction mixture in a horizontal polycondensation reactor and at a temperature of from 200° C. to about 310° C. and a pressure up to 10 Torr to obtain a reaction mixture comprising a high molecular weight (co)polycarbonate having a limiting viscosity number of 0.3 to 1.0 dl/g,
   wherein said dihydroxy compound is selected from the group consisting of compounds represented by the following formulas (1), (2), (3) and (4):

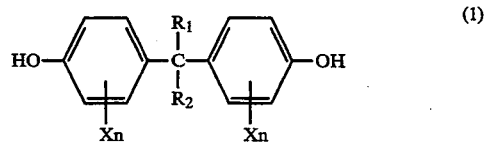

(1)

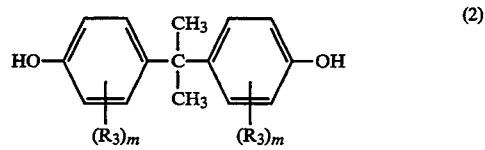

(2)

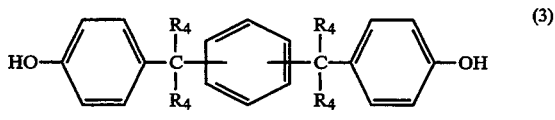

(3)

and

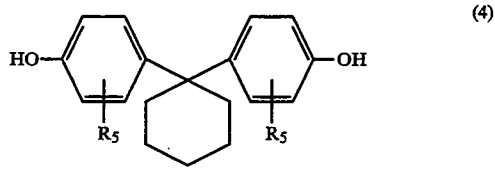

(4)

wherein $R_1$, $R_2$, $R_3$, $R_4$ and $R_5$ each represent a linear or branched alkyl group having 1 to 8 carbon atoms or a phenyl group, X represents a halogen atom, n represents 0 or an integer of 1 to 4, and m represents an integer of 1 to 4.

2. The process for producing a (co)polycarbonate according to claim 1, wherein part of the carbonic diester is removed with the monohydroxy compound in the first step.

3. The process for producing a (co)polycarbonate according to claim 1, wherein a blocking agent is added in the first step, the second step or the third step.

4. The process for producing a (co)polycarbonate according to claim 1, which further comprises a fourth step of adding an additive to the reaction mixture comprising the high-molecular-weight (co)polycarbonate.

5. The process for producing a (co)polycarbonate according to claim 4, wherein the additive is an organic phosphorus compound or a hindered phenol compound.

6. The process for producing a (co)polycarbonate according to claim 4, wherein boric acid or a borate is added in the first step, the second step, the third step or the forth step.

7. The process for producing a (co)polycarbonate according to claim 1, wherein the transesterification catalyst is a compound selected from the group consisting of an electron-donating amine compound, an alkali metal compound and an alkaline earth metal compound.

8. The process for producing a (co)polycarbonate according to claim 1, wherein the transesterification catalyst is a borate.

9. The process for producing a (co)polycarbonate according to claim 1, wherein the cooling of the molten reaction mixture is conducted with an inert substance at a temperature thereof of 50° C. or below in the second step.

10. The process for producing a (co)polycarbonate according to claim 1, wherein the reaction mixture comprising the prepolymer obtained in the first step has a hydroxyl group concentration of $1 \times 10^{-3}$ mol/g or below.

11. The process for producing a (co)polycarbonate according to claim 1, wherein the reaction mixture comprising the high-molecular-weight (co)polycarbonate obtained in the third step has a hydroxyl group concentration of $5 \times 10^{-4}$ mol/g or below.

12. The process for producing a (co)polycarbonate according to claim 1, wherein the prepolymer obtained in the first step has a terminal hydroxyl group content of 50 molar % or below based on all the terminal groups of the prepolymer.

13. The process for producing a (co)polycarbonate according to claim 1, wherein the high-molecular-weight (co)polycarbonate obtained in the third step has a terminal hydroxyl group content of 20 molar % or below based on all the terminal groups of the high-molecular-weight (co)polycarbonate.

14. The process for producing a (co)polycarbonate according to claim 1, wherein two or more dihydroxy compounds selected from the group consisting of compounds represented by the following general formulas (1), (2), (3) and (4) are used:

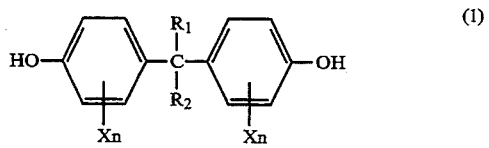

(1)

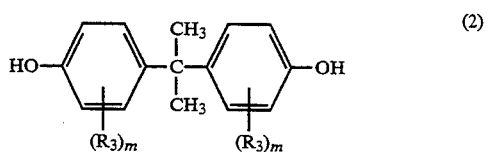

(2)

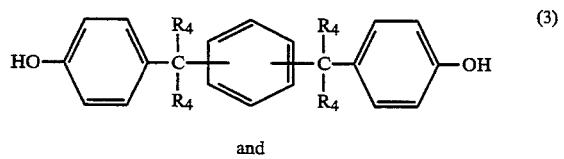

(3)

and

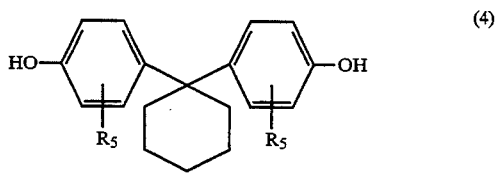

(4)

wherein $R_1$, $R_2$, $R_3$, $R_4$ and $R_5$ each represent a linear or branched alkyl group having 1 to 8 carbon atoms or a phenyl group, X represents a halogen atom, n represents 0 or an integer of 1 to 4, and m represents an integer of 1 to 4.

15. A polycarbonate composition comprising a polycarbonate and boric acid, which has been obtained by the process as defined in claim 7.

16. A polycarbonate composition comprising a polycarbonate and boric acid, which has been obtained by the process as defined in claim 8.

* * * * *